(12) United States Patent
Kusakawa et al.

(10) Patent No.: US 8,055,953 B2
(45) Date of Patent: Nov. 8, 2011

(54) INFORMATION PROCESSING APPARATUS, INFORMATION PROCESSING SYSTEM, INFORMATION PROCESSING METHOD AND COMPUTER PROGRAM

(75) Inventors: Masafumi Kusakawa, Tokyo (JP); Sumio Morioka, Kanagawa (JP); Muneki Shimada, Tokyo (JP); Shiho Moriai, Kanagawa (JP); Dai Sasaki, Tokyo (JP)

(73) Assignees: Sony Corporation, Tokyo (JP); Sony Computer Entertainment Inc., Tokyo (JP)

(*) Notice: Subject to any disclaimer, the term of this patent is extended or adjusted under 35 U.S.C. 154(b) by 200 days.

(21) Appl. No.: 11/791,175

(22) PCT Filed: Nov. 15, 2005

(86) PCT No.: PCT/JP2005/020934
§ 371 (c)(1),
(2), (4) Date: Feb. 5, 2008

(87) PCT Pub. No.: WO2006/057180
PCT Pub. Date: Jun. 1, 2006

(65) Prior Publication Data
US 2008/0256401 A1    Oct. 16, 2008

(30) Foreign Application Priority Data
Nov. 29, 2004   (JP) ............... P2004-343361

(51) Int. Cl.
*G06F 11/00*   (2006.01)
(52) U.S. Cl. ............ 714/48; 714/11; 714/15; 714/43; 714/748
(58) Field of Classification Search ............ 714/11, 714/48, 15, 43, 748
See application file for complete search history.

(56) References Cited

U.S. PATENT DOCUMENTS

| | | | | |
|---|---|---|---|---|
| 4,970,714 A * | 11/1990 | Chen et al. | ............. | 370/216 |
| 5,544,304 A * | 8/1996 | Carlson et al. | ............. | 714/10 |
| 6,098,179 A * | 8/2000 | Harter, Jr. | ............. | 714/4 |
| 6,615,376 B1 * | 9/2003 | Olin et al. | ............. | 714/57 |
| 6,782,492 B1 * | 8/2004 | Nakaso | ............. | 714/42 |
| 2002/0129312 A1 * | 9/2002 | Sipola | ............. | 714/748 |

FOREIGN PATENT DOCUMENTS

| | | |
|---|---|---|
| JP | 5-252048 | 9/1993 |
| JP | 6-311144 | 11/1994 |
| JP | 2003-530795 | 10/2003 |
| JP | 2004-326388 A | 11/2004 |

OTHER PUBLICATIONS

Japanese Office Action issued Jul. 7, 2009 for corresponding Japanese Application No. 2004-343361.

* cited by examiner

*Primary Examiner* — Charles Ehne
(74) *Attorney, Agent, or Firm* — Rader, Fishman & Grauer PLLC

(57) ABSTRACT

The present invention is directed to an information processing system composed of plural information processing units adapted for mutually executing data communication, and for executing data processing in which communication data has been applied. The first entity A transmits error notification data on the basis of error detection to execute initial state return processing on the condition that data reception after error notification data has been transmitted is made, and the second entity B transmits error notification data on the basis of error detection to execute initial state return processing on the condition that transmit processing of error notification data is executed. Thus, the both entities A and B can return to the initial state in a manner synchronous with each other. As a result, it becomes possible to perform reliable error recovery and data processing restart.

9 Claims, 9 Drawing Sheets

INFORMATION PROCESSING APPARATUS, INFORMATION PROCESSING SYSTEM, INFORMATION PROCESSING METHOD AND COMPUTER PROGRAM

TECHNICAL FIELD

The present invention relates to an information processing apparatus, an information processing system, an information processing method, and a computer program, and more particularly to an information processing apparatus, an information processing system, an information processing method and a computer program in which, in the configuration adapted to execute data communication between plural information processing units, and to execute data processing in which communication data is applied, an optimum control corresponding to occurrence of data processing error or communication error is performed thus to realize reliable recovery at the time of occurrence of error.

This Application claims priority of the Japanese Patent Application No. 2004-343361, field on Nov. 29, 2004, the entirety of which will be incorporated by reference herein.

BACKGROUND ART

Hitherto, systems of executing communication between plural information processing apparatuses or units to execute data processing in which communication data have been applied are utilized in various fields. Such systems are directed to a system of executing data processing in which communication data have been applied in plural information processing units adapted for executing data communication through, e.g., wired or wireless communication network, cable or bus, etc. to calculate final or ultimate processing result.

As one embodiment thereof, in the case of executing, e.g., communication processing between two information processing units or apparatuses A, B, one information processing unit A executes data processing to transmit processing result to the information processing unit B, and the information processing unit B executes data processing in which received processing result has been applied to perform such a processing to transmit the data thus obtained to the information processing unit A, etc. There are utilized, in various fields, systems of executing not only such communication sequence, but also data processing in which transmit/receive data has been applied while performing transmission/reception of data between plural information processing units.

In such configuration involving data communication and/or data processing, how to cope with the case where data processing error and/or data communication error take place becomes problem. Entities A and B as the information processing units repeat, plural times, executions of internal processing different from each other and data transmission/reception of the results thereof to thereby examine information processing systems for executing specific processing. In these systems, data processing within the entities A and B as the information processing units are executed so that transmission/reception of processed result data is performed. Further, new internal processing is executed on the basis of the transmission/reception data.

In the case where such data processing is performed, it is required that processing sequence is precisely maintained. Namely, the internal states within the respective entities are required to be synchronous with each other. However, in actual systems, there is the possibility that difference may take place between internal states of respective entities, i.e., asynchronization between internal states may take place by communication error at the time of transmission/reception of data and/or internal processing error in the case where the internal processing fails to be correctly performed, etc. In such case; there is required a mechanism to eliminate difference between internal states of respective entities to synchronize those internal states.

In the case where asynchronization of the internal states between apparatuses or units ordinarily takes place by internal processing error, etc., the entity A which has detected error notifies an apparatus of the opposite side in communication of occurrence of internal processing error, and the entity A itself returns to the initial state. Moreover, the entirety B which has received notification of the internal processing error returns to the initial state as it is to thereby have ability to synchronize both internal states in the initial state.

Such state synchronization processing can be applied only in the case where it can be recognized that error has taken place in data processing executed in one entity. Namely, in the case where the entity A has transmitted result data of correct data processing, but communication error takes place at the time of transferring such data, the entity A cannot recognize occurrence of error.

At the entity B, even if it is possible to detect communication error by parity check, etc., it is impossible to judge whether or not communication error has taken place with respect to normal data, whether or not communication error has taken place with respect to the internal processing error, and/or whether corresponding error is communication error or internal processing error so that the entity B returns to the initial state as it is.

As stated above, the entity A shifts to the internal state on the assumption that correct processing is executed, and the entity B returns to the initial state on the other hand. As a result, asynchronization of internal states would take place between entities A and B.

As a simplest technique of solving such problem, there is conceivable a method in which in the case where the entity B detects communication error, reception thereof is notified to the entity A. However, in the case where the entity attempt to continuously transmit data, the entities A and B are brought into the state where they transmit data each other so that there may take place cases where processing cannot be continued. In addition, even in the case where the entity A is data receiving wait state, when data length of error notification data that the entity B intends to transmit and data length of data that the entity A intends to receive are not in correspondence with each other, there may take place the problems where error notification communication data cannot be completely transmitted, and/or data receiving state at the entity A is continued even if data is transmitted, etc.

DISCLOSURE OF THE INVENTION

Problems to be Solved by the Invention

The present invention has been proposed in view of problems as described above, and its object is to provide an information processing apparatus, an information processing system, an information processing method, and a computer program in which, in the configuration adapted for executing communication between entities such as plural information processing units or apparatuses, and to perform data processing to which communication data has been applied, even in the case where both internal processing error and communication error take place, both entities which execute communication processing can correctly recognize occurrence of error to perform reliable error recovery with respective internal states being synchronized with each other to restart data processing.

One embodiment of the present invention is directed to an information processing system composed of plural information processing units for mutually executing data communication, and for executing data processing in which communication data has been applied, which includes: a first information processing unit for transmitting error notification data on the basis of detection of data processing error or error of receive data to execute initial state return processing on the condition that data reception is made after the error notification data has been transmitted; and a second information processing unit for transmitting error notification data on the basis of detection of data processing error or error of receive data to execute initial state return processing on the condition that transmit processing of the error notification data has been executed.

Another embodiment of the present invention is directed to an information processing apparatus adapted for executing data communication, and for executing data processing in which communication data has been applied, which includes: an error detecting unit for detecting error occurrence in internal data processing that the information processing apparatus itself executes, or occurrence of communication error of receive data from an apparatus of the opposite side in communication; a communication unit for transmitting error notification data on the basis of the error detection; and a data processing unit for executing initial state return processing on the condition that data reception is made after the error notification data has been transmitted.

A further embodiment of the present invention is directed to an information processing apparatus adapted for mutually executing data communication, and for executing data processing in which communication data has been applied, which includes: an error detecting unit for detecting error occurrence in internal data processing that the information processing apparatus itself executes, or occurrence of communication error of receive data from an apparatus of the opposite side in communication; a communication unit for transmitting error notification data on the basis of the error detection; and a data processing unit for executing initial state return processing on the condition that the error notification data has been transmitted.

A still further embodiment of the present invention is directed to an information processing method of executing data communication, and of executing data processing in which communication data has been applied, which includes: an error detection step of detecting error occurrence in internal data processing that an own communication apparatus executes, or occurrence of communication error of receive data from an apparatus of the opposite side in communication; an error notification data transmit step of transmitting error notification data on the condition that error detection at the error detection step has been made; and an initial state return step of executing initial state return processing on the condition that data reception is made after the error notification data has been transmitted.

A still more further embodiment of the present invention is directed to an information processing method of executing data communication, and of executing data processing in which communication data has been applied, which includes: an error detection step of detecting error occurrence in internal data processing that an own communication apparatus executes, or occurrence of communication error of receive data from an apparatus of the opposite side in communication; an error notification data transmit step of transmitting error notification data on the condition that error detection at the error detection step has been made; and an initial state return step of executing initial state return processing on the condition that the error notification data has been transmitted.

A still further embodiment of the present invention is directed to a computer program for allowing computer to execute data communication, and to execute data processing in which communication data has been applied, which includes an error detection step of detecting error occurrence in internal data processing that an own communication apparatus executes, or occurrence of communication error of receive data from an apparatus of the opposite side in communication; an error notification data transmit step of transmitting error notification data on the condition that error detection at the error detection step has been made; and an initial state return step of executing initial state return processing on the condition that data reception is made after the error notification data has been transmitted.

A still more further embodiment of the present invention is directed to a computer program for allowing computer to execute data communication, and to execute data processing in which communication data has been applied, which includes: an error detection step of detecting error occurrence in internal data processing that an own communication apparatus executes, or occurrence of communication error of receive data from an apparatus of the opposite side in communication; an error notification data transmit step of transmitting error notification data on the condition that error detection at the error detection step has been made; and an initial state return step of executing initial state return processing on the condition that the error notification data has been transmitted.

It is to be noted that the computer program to which the present invention is applied is computer program which can be provided by memory medium and/or communication medium, e.g. memory medium such as CD (Compact Disc), FD (Floppy Disc) or MO (Magneto Optical) disc, etc., and/or communication medium such as network, etc., which are offered, in a computer readable form, to general purpose computer system which can execute, e.g., various program codes. By providing such program in a computer readable form, processing corresponding to program can be realized on the computer system.

In accordance with the present invention, in the information processing system composed of plural entities (information processing units) for performing internal data communication and for mutually executing data communication, there is employed the configuration in which the first entity transmits error notification data on the basis of error detection to execute initial state return processing on the condition that data reception is made after the error notification data has been transmitted, and the second entity transmits error notification data on the basis of error detection to execute initial state return processing on the condition that transmit processing of the error notification data has been executed. Accordingly, both entities can return to the initial state in such a manner that they are securely synchronized. Thus, reliable error recovery and data processing restart can be realized.

Further, by employing the present invention, in the configuration adapted for executing data processing involving data communication between entities A and B, with respect to error occurrence in different forms such as error occurrence in data processing (internal processing) of the entity A, error occurrence in data processing (internal processing) of the entity B, error occurrence in communication data from the entity A to the entity B, and/or error occurrence in communication data from the entity B to the entity A, etc, there is employed the configuration in which the entity A transmits error notification data on the basis of error detection to execute initial state return processing on the condition that any data is received after the error notification data has been transmitted, and the entity B transmits error notification data on the basis of error detection to execute initial state return processing on the condition that transmit processing of the error notification data has been executed. Accordingly, both entities can return to the initial state in such a manner that they are securely synchronized with each other. Thus, reliable error recovery and/or data processing restart can be realized.

Still more objects, features and/or merits of the present invention will become apparent from the explanation of the present invention which will be described later and more detailed explanation based on the attached drawings. It is to be noted that, in this specification, the system is caused to be of the configuration comprised of logical sets of plural units or apparatuses, and it is not limited that units or apparatuses of respective configurations exist within the same casing.

BEST MODE FOR CARRYING OUT THE INVENTION

Figure 1:
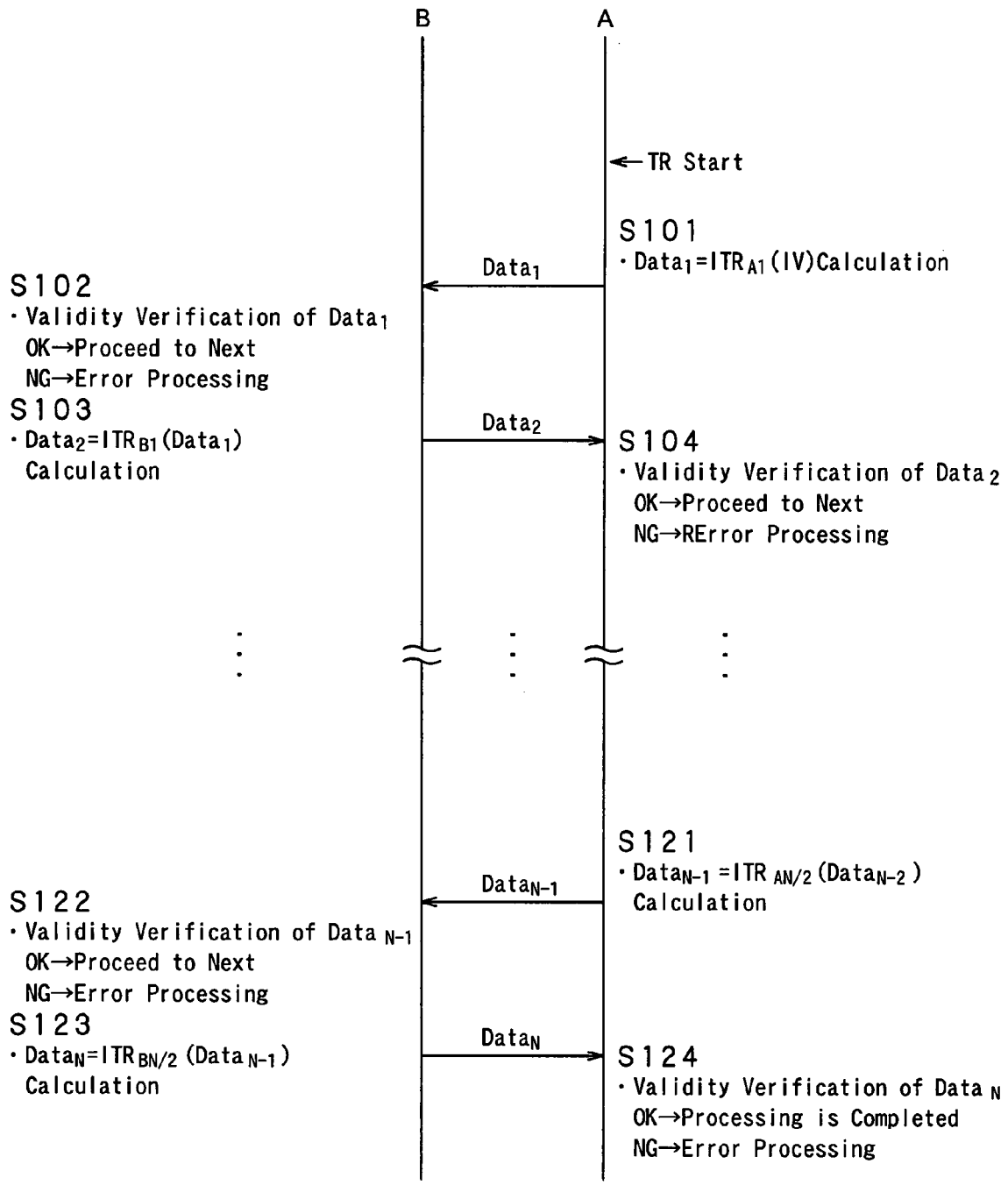
FIG. 1 is a sequence diagram showing data processing procedure involving data communication between entities A and B.

Preferred embodiments of an information processing apparatus, an information processing system, an information processing method and a computer program to which the present invention is applied will now be explained in detail with reference to the attached drawings.

In accordance with the present invention, in the configuration adapted for executing communication between plural information processing apparatuses, and to perform data processing in which communication data has been applied, also in the case where either internal processing error or communication error has taken place, both entities A and B as information processing apparatuses are operative to correctly recognize occurrence of error to synchronize respective internal states to thereby have ability to perform reliable error recovery and processing restart.

In the following explanation of the present invention, two information processing apparatuses adapted for executing data processing while performing communication will be assumed as entities A and B. In addition, meanings of respective symbols are defined as described below.

A: Entity which first transmits data in mutual communication

B: Entity TR which performs communication with the entity A: A specific processing executed as the result of the fact that A and B perform communication with each other $ITR_{xi}(V)$: the i-th internal processing (i=0, 1, 2 . . . ) using value V by Entity X $Data_j$: the j-th data IV subject to processing or communication in data processing; Initial value for TR execution $S_{xi}$: Internal state of entity X (Initial state of the entity A is $S_{A0}$, Initial state of the entity B is $S_{B0}$)

In the case where any error takes place in the information processing system in which the entities A and B mutually perform communication to thereby execute processing or transaction (TR), the respective entities A and B return to respective initial states ($S_{A0}$, $S_{B0}$) to thereby realize synchronization of the internal states. As error recovery processing at the time of detecting error (hereinafter simply referred to as "error processing"), there ordinarily exist two kinds of methods for countermeasure.

(Processing 1) Return to the initial state as it is.

(Processing 2) Error notification data is transmitted to the opposite side in communication to return to the initial state. The entity which has received the error notification data returns to the initial state as it is.

First, in the case of the (processing 1), the entity A which has detected error in the internal state $S_{Ai}$ returns from the internal state $S_{Ai}$ to the initial state $S_{A0}$. On the other hand, since the entity B cannot recognize occurrence of error, its internal state remains to be $S_{Bi}$. Accordingly, in the case where the entity A tries to restart data processing (TR), TR would be executed under the state where the internal states of the entities A and B are asynchronous therebetween. As a result, correct execution result cannot be obtained. This also similarly applies to the case where the entity B has detected in the internal state $S_{Bi}$.

In this case, in order to synchronize internal states of the respective entities, time-out processing is required. Namely, it is necessary that the entity which has detected error performs such an operation to interrupt processing for a predetermined time thereafter to return to the initial state, and the other entity performs such a processing to detect occurrence of error resulting from the fact that data is not transmitted for a predetermined time to return to the initial state. Such time-out processing has the problem that it is not easy to suitably set time by taking delay, etc. of data into consideration.

On the other hand, in the case of the (processing 2), the entity A which has detected error in the internal state $S_{Ai}$ transmits error notification data to the entity B thereafter to return from the internal state $S_{Ai}$ to the initial state $S_{A0}$, and the entity B receives the error notification data thereafter to return to the initial state $S_{B0}$ so that synchronization of the internal states can be made.

However, in the case where there exists processing such that transmitting processing from the entity A to the entity B are continuously performed plural times, when communication error takes place in transmit data from the entity A, the entity B attempts to transmit error notification data to the entity A. However, since the entity A attempts to transmit the remaining data at the same time, both entities are simultaneously brought into transmitting state. Particularly, in the case of the hardware, there is the possibility that there may result dead lock state. As stated above, the above described measurements of (the processing 1) and (the processing 2) make it difficult to securely synchronize internal states to perform error recovery.

The present invention is a system in which setting is made so as to satisfy a certain condition in the information processing system adapted for mutually performing communication to thereby securely synchronize internal states of respective entities. Setting condition, execution of TR in ordinary state, error processing and the operation at the time when error takes place will be described.

(1) Setting Condition

In order to permit synchronization of internal states of respective entities also in the case where error takes place, information processing system is constructed so as to satisfy the following setting condition. In this case, the information processing system is composed of plural entities such as information processing units, etc. adapted for executing mutual communication to execute data processing.

(Setting 1): Transmit data permits detection of presence/absence of communication error on the receiving side.

(Setting 2): Data subject to transmitting and receiving is permitted to be received irrespective of presence/absence of error.

(Setting 3): Transmitting/Receiving operations are necessarily alternately repeated.

(Setting 4): The entity B permits reception of data from the entity A after final data has been transmitted, or is permitted to be reset It is to be noted that these setting conditions 1 to 4 can be realized, e.g., in a manner described below in the information processing system for mutually performing communication.

(Setting 1): At the time of transmitting data, the data transmitting side entity adds parity bit or check sum as information for error confirmation or correction corresponding to transmit data to transmit the transmit data thus obtained. On the other hand, the data receiving side entity calculates parity bit or check sum of receive data to judge as to whether or not there is error in data.

(Setting 2): Data length and packet length, etc. of data to be transmitted are caused to be the same value in all data. Alternatively, the bit length subject to transmission/reception once between entities A and B is caused to be fixed.

(Setting 3): The entities A and B are caused to be of the configuration adapted for performing an operation such that "it is prohibited to execute internal processing until the subsequent data is received after data has been transmitted", and the entity A is caused to be first data transmitter.

(Setting 4): There is employed a configuration to place the operation of the entirety B in data receive wait state, or in reset wait state from the entity A after TR execution is completed.

[Execution Example of Data Processing (TR) in Ordinary State]

The processing example for executing data communication between entities A and B will be explained. First, explanation will be given with reference to FIGS. 1 to 3 in connection with the example of communication processing and data processing in the respective entities A, B.

Here, it is assumed that the entities A and B respectively execute N number of internal processing (data processing) and 2N number of data transmitting/receiving operations so that the entire data processing (TR) is completed. As an initial value used in the data processing, the initial value IV is caused to be equal to $Data_0$.

Figure 2:
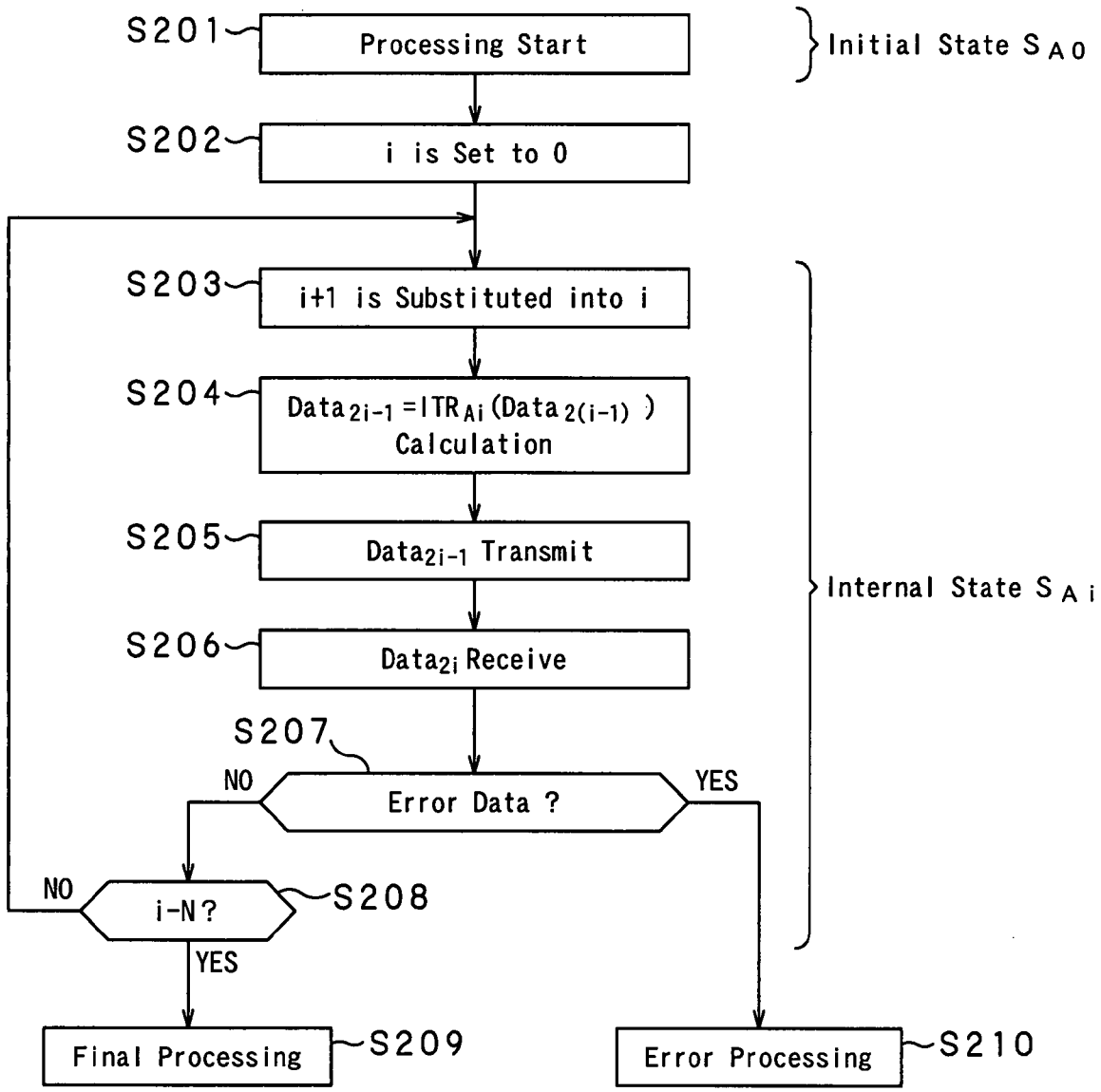
FIG. 2 is a flowchart showing processing that the entity A executes in data processing involving data communication between entities A and B.
Figure 3:
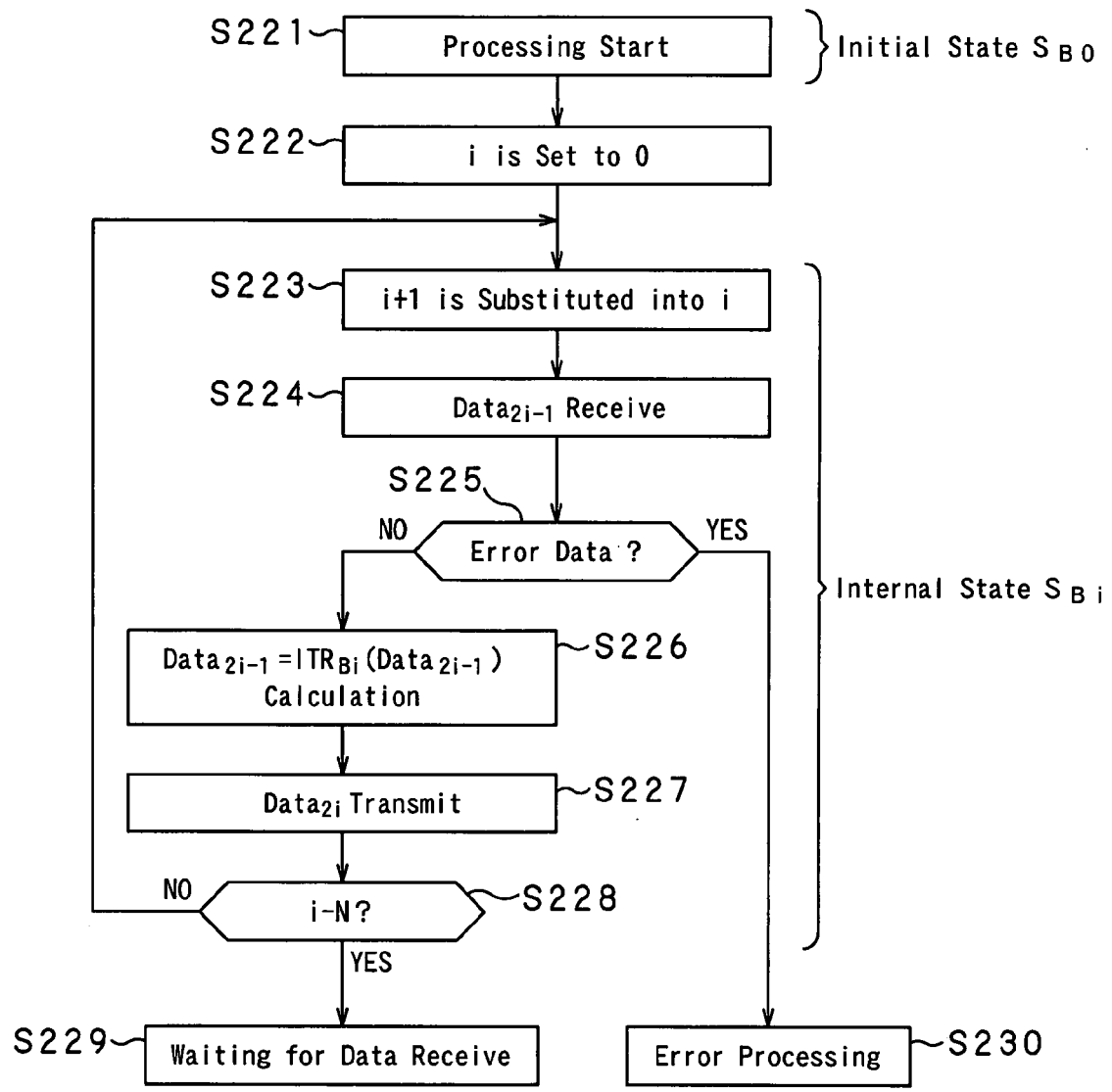
FIG. 3 is a flowchart showing processing that the entity B executes in data processing involving data communication between the entities A and B.

The sequence diagram of the entire processing is shown in FIG. 1, and the flowcharts for explaining execution procedure of the internal processing of the entities A and B are shown in FIGS. 2 and 3.

First, the sequence of the entire processing will be explained in accordance with FIG. 1.

After processing is started (TR is started), at step S101, the entity A executes data processing (internal processing) $ITR_{A1}$ in which initial value (IV) is applied to calculate result data $Data_1$ of data processing based on the initial value (IV). Namely, data $Data_1$ is obtained by the following expression:

$$Data_1 = ITR_{A1}(IV)$$

The entity A transmits the data $Data_1$ to the entity B.

At step S102, the entity B executes validity verification processing of data which has been received from the entity A. Parity bit or check sum as information for error confirmation or correction is added to the data $Data_1$. Thus, the entity B calculates parity bit or check sum of receive data to judge as to whether or not there is error in data.

In the case where it is judged that there is error in data, processing shifts to error processing. The error processing will be explained in detail later. In the case where it is judged that there is no error in data, the entity B executes, at step S103, data processing (internal processing) $ITR_{B1}$ in which receive data ($Data_1$) has been applied to calculate result data $Data_2$ of data processing based on the data ($Data_1$). Namely, the data $Data_2$ is obtained by the following expression.

$$Data_2 = ITR_{B1}(Data_1)$$

The entity B transmits this data $Data_2$ to the entity A.

At step S104, the entity A executes validity verification processing of data which has been received from the entity B. Parity bit or check sum as information for error confirmation or correction is also added to data $Data_2$. Thus, the entity A calculates parity bit or check sum of receive data to judge as to whether or not there is error in data.

In the case where it is judged that there is error in data, processing shifts to error processing. In the case where it is judged that there is no error in data, data processing (internal processing) $ITR_{A2}$ in which receive data ($Data_2$) has been applied is executed to calculate result data Data of data processing based on the data ($Data_2$).

Such data processing, data transmission and data validity verification processing are repeatedly executed. At steps S121 to S124, processing similar to those of steps S101 to S104 are finally executed. At step S124, the entity A executes validity verification of data $Data_N$ which has been received from the entity B. In the case where there is obtained the judgment in which there is no error in data, processing is completed.

In the case where error does not take place in all data processing and data communications, the entities A and B respectively execute N number of internal processing (data processing) and 2N number of data transmitting/receiving operations so that the entire data processing (TR) are completed.

Respective sequences of the entities A and B will now be explained. First, processing of the entity A will be explained with reference to FIG. 2.

At step S201, processing is started. At step S202, setting of i=0 is performed as initial value setting of parameter i. The parameter i corresponds to the parameter i of the internal state $S_{Ai}$. In this state, the internal state is placed in initial state $S_{A0}$. In this example, the respective entities store and hold own internal states during data processing. Namely, the entity A holds the internal state $S_{Ai}$ (i=0, 1, . . . ), and the entity B holds the internal state $S_{Bi}$ (i=0, 1, . . . ).

At step S203, parameter updata processing to increment parameter i by one is executed. Namely, update processing expressed below is executed.

$$i=i+1$$

Then, at step S204, data processing (internal processing) is executed. This data processing is executed, as a processing to calculate processing result data $Data_{2i-1}$, by processing $ITR_{Ai}$ in which data $Data_{2(i-1)}$ has been applied. Namely, data $Data_{2i-1}$ is calculated by the following expression.

$$Data_{2i-1}=ITR_{Ai}(Data_{2(i-1)})$$

At step S205, result data $Data_{2i-1}$ of data processing (internal processing) of the step S204 is transmitted to the entity B. Thereafter, at step S206, result data $Data_{2i}$ of data processing (internal processing) at the entity B is received from the entity B.

At step S207, validity verification of receive data $Data_{2i}$ is executed. In the case where validity is confirmed, processing proceeds to step S208 to judge as to whether or not the parameter i is equal to the maximum value N. In the case where i<N, update processing of parameter i is executed at step S203 since there is processing to continue to repeatedly execute processing of the step S204 and steps subsequent thereto. When it is finally judged at the step S208 that the parameter i is equal to the maximum value N, communication is completed to proceed to step S209 to execute the final processing. Thus, all processing are completed.

In the case where it is judged at the step S207 that there is no validity in receive data $Data_{2i}$, processing proceeds to step S210 to shift to error processing. The detail of the error processing will be explained later.

The processing of the entity B will now be explained with reference to FIG. 3. At step S221, processing is started. At step S222, setting of i=0 is performed as initial value setting of the parameter i. The parameter i corresponds to parameter i of the internal state $S_{Bi}$. In this state, the internal state is placed in the initial state $S_{B0}$.

At step S223, parameter update processing to increment the parameter i by one is executed.

$$i=i+1$$

Then, at step S224, data is received from the entity A. The receive data is result data of the internal processing at the entity A, i.e., data $Data_{2i-1}$. At step S225, validity verification of receive data $Data_{2i-1}$ is executed. The validity verification processing is executed as a processing in which, e.g., parity bit or check sum given to receive data is applied.

In the case where validity of receive data is confirmed, processing proceeds to step S226 to execute data processing (internal processing) on the entity B side in which receive data $Data_{2i-1}$ is applied. This data processing is executed, as a processing to calculate processing result data $Data_{2i}$, by the processing $ITR_{Bi}$ in which receive data $Data_{2i-1}$ from the entity A is applied. Namely, data $Data_{2i}$ is calculated by the following expression.

$$Data_{2i}=ITR_{Bi}(Data_{2i-1})$$

At step S227, result data $Data_{2i}$ of data processing (internal processing) at the step S226 is transmitted to the entity A. Thereafter, at step S228, whether or not the parameter i is equal to N is judged. In the case where i<N, since there is continuous processing, update processing of the parameter I is executed at step 223 to repeatedly execute processing of the step S224 and steps subsequent thereto. When it is finally judged at step S228 that the parameter i is equal to the maximum value N, since there is no continuous processing on the entity side, processing proceeds to step S229 to shift to data receive wait state from the entity A.

In the case where error of receive data is confirmed in validity verification of receive data $Data_{2i-1}$ at the step S225, processing proceeds to step S230 to shift to error processing. The detail of the error processing will be explained later.

The data processing sequence involving communication between the entities A and B has been explained with reference to FIGS. 1 to 3. In this example, the algorithm of these processing is described as the following algorithm.

[Algorithm]

1 i is set to zero.

2 i+1 is substituted into i.

3 The entity A calculates $Data_{2i-1}=ITR_{Ai}(Data_{2(i-1)})$ to transmit it to the entity B.

4 The entity B receives $Data_{2i-1}$ to judge as to whether or not there is error in that data.

If there is error, error processing is executed. If there is no error, processing proceeds to the next.

5 The entity B calculates $Data_{2i=ITR_{Bi}}(Data_{2i-1})$ to transmit it to the entity A.

6 The entity A receives $Data_{2i}$ thereafter to judge as to whether or not there is error in that data.

If there is error, error processing is executed. If there is no error, processing proceeds to the next.

7 If i is equal to N, the final processing is executed. Thus, TR is completed. If i is not equal to N, processing to phase 2.

[Error Processing]

The processing in the case where error takes place in data processing involving communication between entities will now be explained.

The error occurrence mode in the data processing involving communication between entities A and B are classified into four modes.

(1) Error occurrence in data processing (internal processing) $ITR_{Ai}$ of the Entirety A (2) Error occurrence in data processing (internal processing) $ITR_{Bi}$ of the entirety B (3) Error occurrence in communication data $Data_{2i-1}$ from the entirety A to the entirety B (4) Error occurrence in communication data $Data_{2i}$ from the entirety A to the entirety B There is the possibility that errors of the four modes may take place.

In these all error modes, the entities A and B execute the same error processing. The entities A and B execute respective error processing. First, the error processing sequence in these respective entities will be explained with reference to the flowcharts of FIGS. 4 and 5. Thereafter, processing sequence corresponding to the above-mentioned respective error modes (1) to (4) will be explained.

First, the processing procedure that the entity A executes at the time when error takes place will be explained with reference to the flowchart shown in FIG. 4.

In the case where the entity A detects error occurrence, or is notified of error occurrence from the entity B it transmits error notification data to the entirety B at step S301. In this example, the entity A detects error occurrence or is notified of error occurrence from the entity B by itself. Such processing is practically classified into cases as described below.

(1) Error occurrence in data processing (internal processing) $ITR_{Ai}$ of the entity A (4) Error occurrence in communication data $Data_{2i}$ from the entity B to the entity A.

In these two cases, the entity A performs error detection. On the condition that such error detection is made, the entity A transmits initial error notification to the entity B at step S301.

(2) Error occurrence in data processing (internal processing) $ITR_{Bi}$ of the entity B (3) Error occurrence in communication data $Data_{2i-1}$ from the entity A to the entity B.

In these two cases, the entity B performs error detection so that initial error notification is transmitted from the entity B to the entity A. In accordance with reception of this error notification, the entity A sends error notification back to the entity B.

The error notification processing at the step S301 is error notification processing corresponding to processing every the respective error modes. Thereafter, the entity A receives error notification data from the entity B at step S302. At step S303, the entity A returns to the initial state $S_{A0}$ on the condition that error notification from the entity B has been received.

As stated above, the entity A executes (A1) error notification data transmit processing (A2) error notification data receive processing after error notification data has been transmitted, and (A3) processing to return to the initial state $S_{A0}$ on the condition that these error notification data transmit/receive processing have been executed.

This processing sequence is a processing executed commonly to all the above-described error occurrence modes of (1) to (4).

It is to be noted that, in the above-described processing, there are instances where communication error may take place in the (A2) error notification data receive processing after error notification data has been transmitted, and the entity A cannot thus confirm that receive data is error notification data. However, even in this case, the entity A executes a processing to return to the initial state $S_{A0}$. Namely, the entity. A executes a processing to return to the initial state $S_{A0}$ even when it cannot be confirmed that receive data is error notification data in the case where it executes.

(A1) error notification data transmit processing thereafter to receive data from the entity B. This processing will be explained in the item of [processing example with respect to communication error of error notification data] which will be described later.

A processing procedure that the entity B executes at the time when error takes place will now be explained with reference to the flowchart shown in FIG. 5.

In the case where the entity B detects error occurrence, or is notified of error occurrence from the entity A, it transmits error notification data to the entity A at step S321. In this case, in the above-described processing of (1) to (4), the entity B detects error occurrence, or is notified of error occurrence from the entity A by itself. Such processing is classified into practical cases described below.

(2) error occurrence in data processing (internal processing) $ITR_{Bi}$ of the entity B (3) error occurrence of communication data $Data_{2i-1}$ from the entity A to the entity B.

In these two cases, the entity B performs error detection, and the entity B transmits initial error notification to the entity A at step S321 on the condition that such error detection is made.

(1) error occurrence in data processing (internal processing) $ITR_{Ai}$ of the entirety A (4) error occurrence in communication data $Data_{2i}$ from the entity B to the entity A.

In these two cases, the entity A performs error detection so that initial error notification is transmitted from the entity A to the entity B. In accordance with reception of the error notification, the entity B sends error notification back to the entity A at the step S321.

The error notification processing at the step S321 is error notification processing every the respective error modes. Thereafter, the entity B returns to the initial state $S_{B0}$ at step S322.

As stated above, the entity B executes (B1) error notification data transmit processing, and (B2) processing to return to the initial state $S_{A0}$ on the condition that error notification data transmit processing has been executed.

This processing sequence is a processing executed commonly to all the above-mentioned error occurrence modes.

Data processing and communication sequence in the following error occurrence modes:

(1) error occurrence in data processing (internal processing) $ITR_{Ai}$ of the entity A, (2) error occurrence in data processing (internal processing) $ITR_{Bi}$ of the entity B, (3) error occurrence in communication data $Data_{2i-1}$ from the entity A to the entity B, and (4) error occurrence in communication data $Data_{2i}$ from the entity B to the entity A will be explained with reference to FIGS. 6 to 9.

Figure 6:
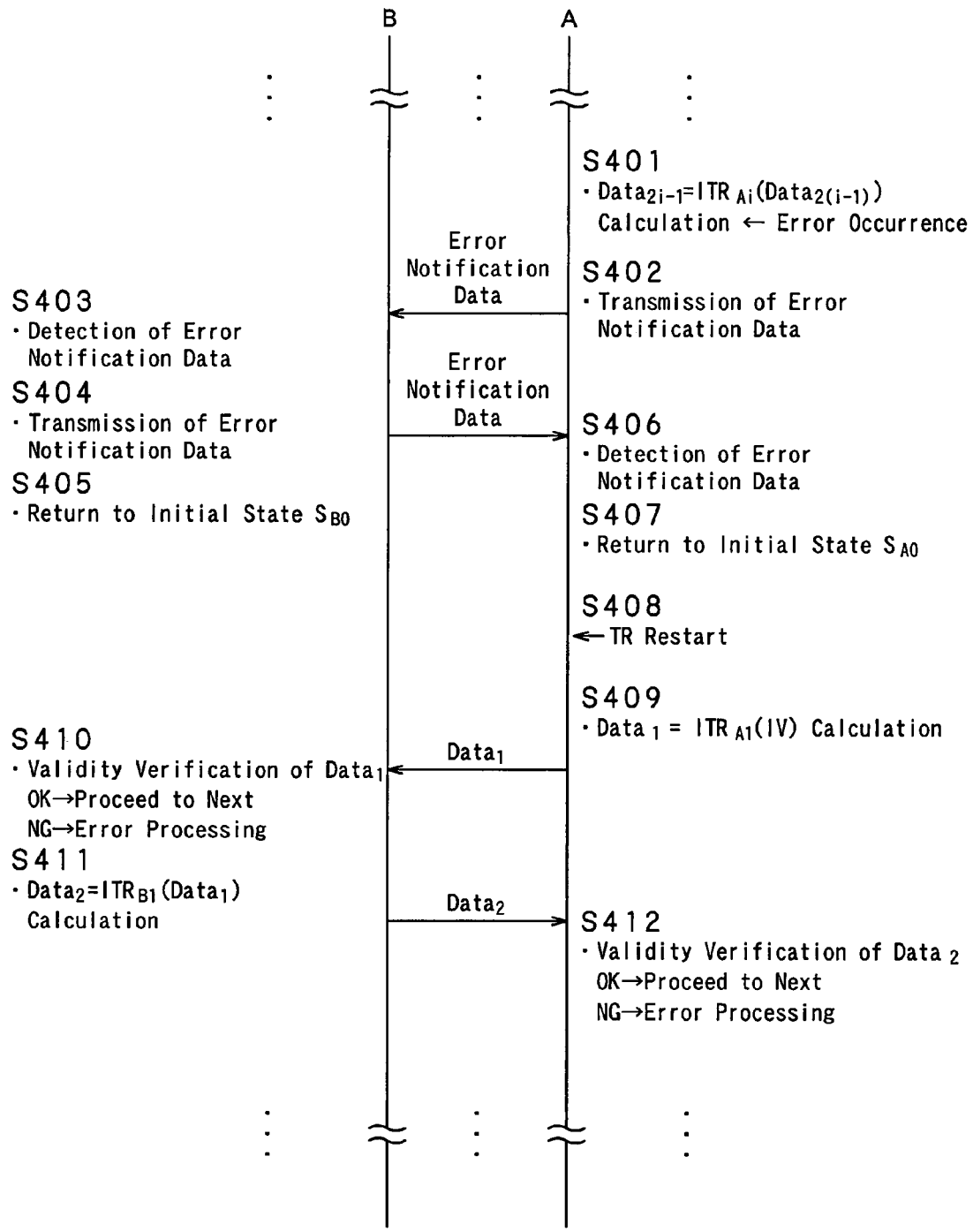
FIG. 6 is a sequence diagram showing processing in the case where error has taken place in data processing (internal processing) of the entity A in data processing involving data communication between the entities A and B.

FIG. 6 is a sequence diagram for explaining processing procedure corresponding to error occurrence in data processing (internal processing) $ITR_{Ai}$ of the (1) entity A. Processing are executed in order of steps S401 to S412. In this example, processing from step S401 up to S407 in the steps S401 to S412 are processing corresponding to error, and processing of step S409~indicate processing of processing restart and processing after processing restart. Processing for complying with error of steps S401 to s407 are executed at an arbitrary timing for an execution time period of data processing involving communication between entities A and B.

First, at step S401, the entity A detects that any error has taken place in data processing (internal processing) $ITR_{Ai}$ of the entity A. When error detection is made, the entity A transmits error notification data to the entity B at step S402. The processing for transmitting error notification data corresponds to a processing for transmitting error notification data at the step S301 in the flowchart of the FIG. 4 which has been already explained.

Then, the entity B receives error notification data from the entity A at step 403 to transmit error notification data to the entity A at step S404 thereafter to return to the initial state $S_{B0}$ at step S405. The error notification data transmit processing at the step S404 corresponds to the error notification data transmit processing at the step S321 in the processing flow which has been already explained with reference to FIG. 5, and the initial state $S_{B0}$ return processing at the step S405 corresponds to the initial state $S_{B0}$ return processing at the step S322 in the processing flow of FIG. 5.

Then, the entity A receives error notification data from the entity B at step S406 to return to the initial state $S_{A0}$ at the step S407. The error notification data receive processing at the step S406 corresponds to the error notification data receive processing at the step S302 in the processing flow which has been already explained with reference to FIG. 4, and the initial state $S_{A0}$ return processing at the step S407 corresponds to the initial state $S_{A0}$ return processing at the step S303 in the processing flow of FIG. 4.

It is to be noted that, although explanation will be given in [the processing example with respect to communication error of error notification data] which will be described later, also in the case where the entity A cannot confirm at step S406 by communication error that receive data from the entity B is error notification data, processing proceeds to step S407 to return to the initial state $S_{A0}$. The detail of this processing will be explained later.

The entity A returns to the initial state $S_{A0}$ at the step S407 thereafter to restart data processing (TR) from the initial state at step S408. After processing is restarted, the entity A executes, at step S409, data processing (internal processing) $ITR_{A1}$ in which initial value (IV) has been applied to calculate result data $Data_1$ of data processing based on the initial value (IV). Namely, data $Data_1$ is obtained by the following expression.

$$Data_1 = ITR_{A1}(IV)$$

The entity transmits this data $Data_1$ to the entity B.

At step S410, the entity B executes validity verification processing of data which has been received from the entity A. Namely, the entity B calculates parity bit or check sum to judge as to whether or not there is any error in data. In the case where it is judged that there is any error, processing shifts to error processing.

The error processing in this case is processing at the time of error occurrence in communication data $Data_{2i-1}$ (3) from the entity A to the entity B among the previously described error modes (1) to (4), and will be explained in detail later with reference to FIG. 8.

In the case where it is judged that there is no error in data, the entity B executes, at step S411, data processing (internal processing) $ITR_{B1}$ in which receive data ($Data_1$) has been applied to calculate result data $Data_2$ of data processing based on data ($Data_1$) Namely, data $Data_2$ is obtained by the following expression.

$$Data_2 = ITR_{B1}(Data_1)$$

The entity B transmits the data $Data_2$ to the entity A.

At step S412, the entity A executes validity verification processing of data which has been received from the entity B. The entity A calculates parity bit or check sum with respect to data $Data_2$ to judge as to whether or not there is any error in data. In the case where it is judged that there is any error in data, processing shifts to error processing.

The error processing in this case (4) is processing at the time of error occurrence in communication data $Data_{2i}$ from the entity B to the entity A, and will be explained in detail later with reference to FIG. 9. In the case where it is judged that there is no error in data, data processing (internal processing) $ITR_{A2}$ in which receive data ($Data_2$) has been applied is executed to calculate result data $Data_3$ of data processing based on data ($Data_2$). At times subsequent thereto, data processing, data transmission and data verification processing which are similar to the above will be repeatedly executed.

Figure 4:
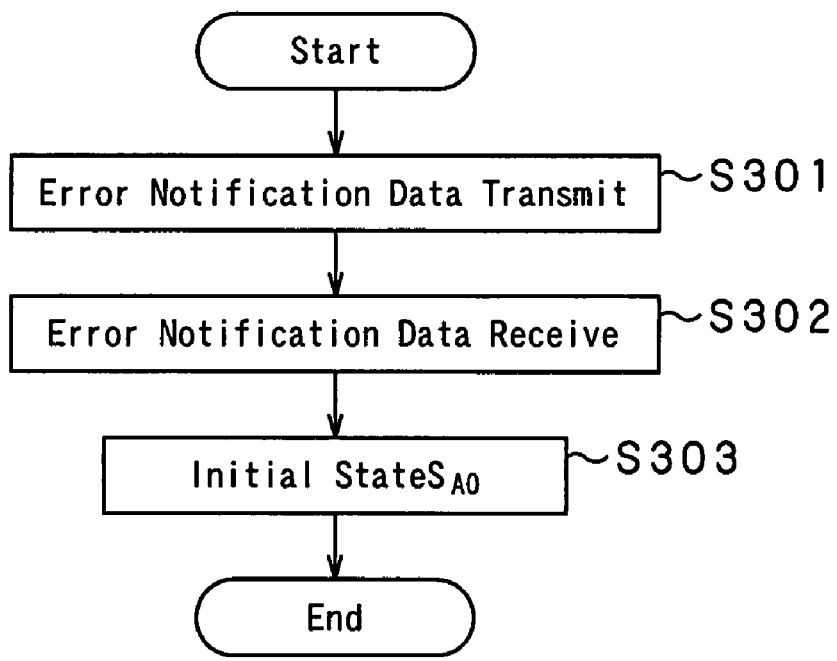
FIG. 4 is a flowchart showing error processing that the entity A executes in data processing involving data communication between the entities A and B.
Figure 5:
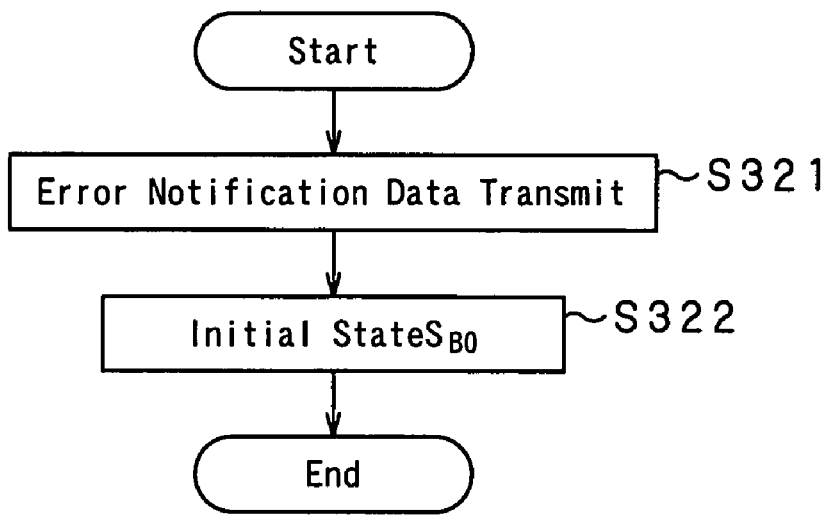
FIG. 5 is a flowchart showing error processing that the entity B executes in data processing involving data communication between the entities A and B.

As understood from the sequence which has been explained above, (1) in the error processing corresponding to error occurrence in data processing (internal processing) $ITR_{Ai}$ of the entity A, the entity A executes the processing in accordance with the flowcharts of FIGS. 4 and 5 which has been already explained, i.e., (A1) error notification data transmit processing, (A2) error notification data receive processing after error notification data has been transmitted, or communication error data receive processing, and (A3) processing to return to the initial state $S_{A0}$ on the condition that these data transmit/receive processing have been executed.

On the other hand, the entity B executes (B1) error notification data transmit processing, and (B2) processing to return to the initial state $S_{A0}$ on the condition that the error notification data transmit processing has been executed.

The respective entities execute these processing so that they can respectively return to initial states $S_{A0}$, $S_{B0}$ in a manner synchronous with each other. Thus, it becomes possible to perform error recovery processing in which internal states are securely synchronized.

A processing procedure (2) complying with error occurrence in data processing (internal processing) $ITR_{Bi}$ of the entity B will now be explained with reference to FIG. 7. Processing are executed in order of steps S501 to S517. In this case, the steps S502 to S512 in the steps S501 to S517 indicate error detection processing and processing to comply with error, and processing of step S513~indicate processing restart and processing after processing restart. The processing to comply with error at the steps S502 to S512 are executed at an arbitrary timing for an execution time period of data processing involving communication between entities A and B.

First, at step S501, the entity A executes data processing (internal processing) $ITR_{Ai}$ of the entity A to obtain $Data_{2i-1}$ by the following expression.

$$Data_{2i-1} = ITR_{Ai}(Data_{2(i-1)})$$

The entity A transmits this data $Data_{2i-1}$ to the entity B.

At step S502, the entity B executes validity verification processing of data which has been received from the entity A. Namely, the entity B calculates parity bit or check sum to judge as to whether or not there is any error in data. In the case where it is judged that there is any error in data, processing shifts to error processing. The error processing in this case (3) is a processing at the time of error occurrence in communication data $Data_{2i-1}$ from the (3) entity A to the entity B in the previously described error modes (1) to (4), and will be explained in detail later with reference to FIG. 8.

In this processing example, the entity B judges at step S502 that validity of data which has been received from the entity A has been confirmed. At step S503, the entity B executes data processing (internal processing) $ITR_{Bi}$ of the entity B to obtain data $Data_{2i}$ by the following expression.

$$Data_{2i} = ITR_{Bi}(Data_{2i-1})$$

In the processing for generating the data $Data_{2i}$, the entity B detects that error has taken place. When error detection is made, the entity B transmits error notification data to the entity A at step S504. The processing for transmitting the error notification data corresponds to the processing for transmitting error notification data at the step S321 in the flowchart of FIG. 5 which has been already explained.

Thereafter, the entity B returns to the initial state $S_{B0}$ at step S505. The initial state $S_{B0}$ return, processing at the step S505 corresponds to the initial state $S_{B0}$ return processing at the step S322 in the processing flow of FIG. 5.

Thereafter, when the entity A receives error notification data from the entity B at step S506, it transmits the error notification data to the entity B at step S507. The processing for transmitting the error notification data corresponds to the processing for transmitting the error notification data at the step S301 in the flowchart of FIG. 4 which has been already explained.

Then, the entity B receives error notification data from the entity A at step S508 to transmit the error notification data to the entity A at step S509 thereafter to return to the initial state $S_{B0}$ at step S510. The error notification data transmit processing at the step S509 corresponds to the error notification data transmit processing at the step S321 in the processing flow which has been already explained with reference to FIG. 5, and the initial state $S_{B0}$ return processing at the step S510 corresponds to the initial state $S_{B0}$ return processing at the step S322 in the processing flow of FIG. 5.

Then, the entity A receives error notification data from the entity B at step S511 to return to the initial state $S_{A0}$ at step S512. The error notification data receive processing at the step S511 corresponds to the error notification data receive processing at the step S302 in the processing flow which has been already explained with reference to FIG. 4, and the initial state $S_{A0}$ return processing at the step S512 corresponds to the initial state $S_{A0}$ return processing at the step S303 in the processing flow of FIG. 4.

In this example, also in the case where it cannot be confirmed by communication error at step S511 that receive data from the entity B is error notification data, processing by the entity A proceeds to step S512 to return to the initial state $S_{A0}$. The detail of this processing will be explained in the [processing example with respect to communication error of error notification data] which will be described later.

The entity A returns to be initial state $S_{A0}$ at step S512 thereafter to restart data processing (TR) from the initial state at step S513. The steps S514 to S517 subsequent thereto are similar to the processing of the steps S409 to S412 of the sequence diagram of FIG. 6, and their explanation will be omitted.

As understood from the sequence which has been explained, also in (2) the error processing to comply with error occurrence in data processing (internal processing) $ITR_{Bi}$ of the entity B, the entity A executes (A1) error notification data transmit processing, (A2) error notification data receive processing after error notification data has been transmitted, or communication error data receive processing, and (A3) processing to return to the initial state $S_{A0}$ on the condition that these error notification data transmit/receive processing have been executed.

On the other hand, the entity B executes (B1) error notification data transmit processing, and (B2) processing to return to the initial state $S_{A0}$ on the condition that the error notification data transmit processing has been executed.

Figure 7:
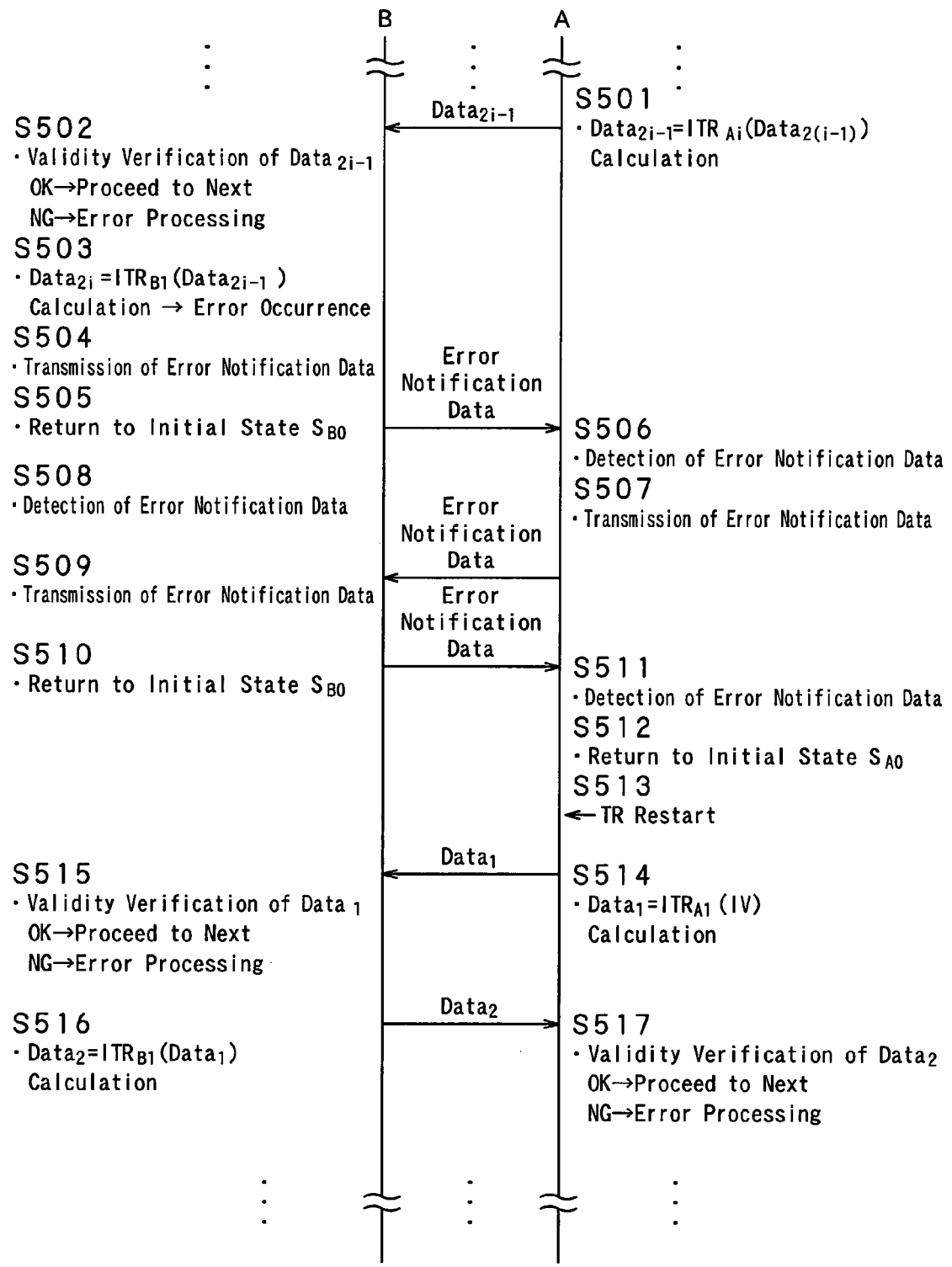
FIG. 7 is a flowchart showing processing in the case where error has taken place in data processing (internal processing) of the entity B in data processing involving data communication between entities A and B.

In the sequence shown in FIG. 7, the entity B executes the processing of B1 and B2 twice. However, since the entity B also returns to the initial state $S_{B0}$ when the entity A returns to the initial state $S_{A0}$, and data processing (TR) is restarted from the initial state at this time point, it becomes possible to perform error recovery in which internal states are securely synchronized.

A processing procedure (3) to comply with error occurrence in communication data $Data_{2i-1}$ from the entity A to the entity B will now be explained with reference to FIG. 8. Processing are executed in order of steps S602 to S616. In this example, the steps S602 to S611 in the steps S601 to S616 indicate error detection processing and processing to comply with error, and processing of the steps S612~indicate processing restart and processing after processing restart. The processing for complying with error at the steps S602 to S611 are executed at an arbitrary timing for an execution time period of data processing involving communication between entities A and B.

First, at step S601, the entity A executes data processing (internal processing) $ITR_{Ai}$ of the entity A to obtain data $Data_{2i-1}$ by the following expression.

$$Data_{2i-1} = ITR_{Ai}(Data_{2(i-1)})$$

The entity A transmits the data $Data_{2i-1}$ to the entity B.

In this processing example, it is assumed that communication error of the communication data $Data_{2i-1}$ has taken place.

At step S602, the entity B executes validity verification processing of data which has been received from the entirety A. Namely, the entity B calculates parity bit or check sum to judge as to whether or not there is any error in data. In the case where it is judged that there is any error in data, processing shifts to error processing.

In this processing example, it is assumed that the entity B has detected error in receive data from the entity A at step S602. In this case, the entity B transmits error notification data to the entity A at step S603. The processing for transmitting the error notification data corresponds to the processing for transmitting error notification data at the step S321 in the flowchart of FIG. 5 which has been already explained.

Thereafter, the entity B returns to the initial state $S_{B0}$ at step S604. The initial state $S_{B0}$ return processing at the step S604 corresponds to the initial state $S_{B0}$ return processing at the step S322 in the processing flow of FIG. 5.

Thereafter, when the entity A has received error notification data from the entity B at step S605, it transmits the error notification data to the entity B at step S606. The error notification data transmit processing corresponds to the error notification data transmit processing at the step S301 in the flowchart of FIG. 4 which has been already explained.

Then, the entity B receives error notification data from the entity A at step S607 to transmit the error notification data to the entity A at step S608 thereafter to return to the initial state $S_{B0}$ at step S609. The error notification data transmit processing at the step S608 corresponds to the error notification data transmit processing at the step S321 in the processing flow which has been already explained with reference to FIG. 5, and the initial state $S_{B0}$ return processing at the step S609 corresponds to the initial state $S_{B0}$ return processing at the step S322 in the processing flow of FIG. 5.

Then, the entity A receives error notification data from the entity B at step S610 to return to the initial state $S_{A0}$ at step S611. The error notification data receive processing at the step S610 corresponds to the error notification data receive processing at the step S302 in the processing flow which has been already explained with reference to FIG. 4, and the initial state $S_{A0}$ return processing at the step S611 corresponds to the initial state $S_{A0}$ return processing at the step S303 in the processing flow of FIG. 4.

It is to be noted that also in the case where it cannot be confirmed at step S610 by communication error that receive data from the entity B is error notification data, processing by the entity A proceeds to step S611 to return to the initial state $S_{A0}$. The detail of this processing will be explained in the [processing example with respect to communication error of error notification data] which will be described later.

The entity A returns to the initial state $S_{A0}$ at step S611 thereafter to restart data processing (TR) from the initial state at step S612. The steps S612 to S616 described below are similar to processing of the steps S409 to S412 of the sequence diagram of FIG. 6, and their explanation will be omitted.

As understood from the sequence which has been explained above, also in (2) error processing to comply with error occurrence in communication data $Data_{2i-1}$ from the entity A to the entity B, the entity A executes the processing in accordance with the flowcharts of FIGS. 4 and 5 which have been already explained, i.e., (A1) error notification data transmit processing, (A2) error notification data receive processing after error notification data has been transmitted, or communication error data receive processing, and (A3) processing to return to the initial state $S_{A0}$ on the condition that these error notification data transmit/receive processing have been executed.

On the other hand, the entity B executes (B1) error notification data transmit processing, and (B2) processing to return to the initial state $S_{A0}$ on the condition that the error notification data transmit processing has been executed.

Figure 8:
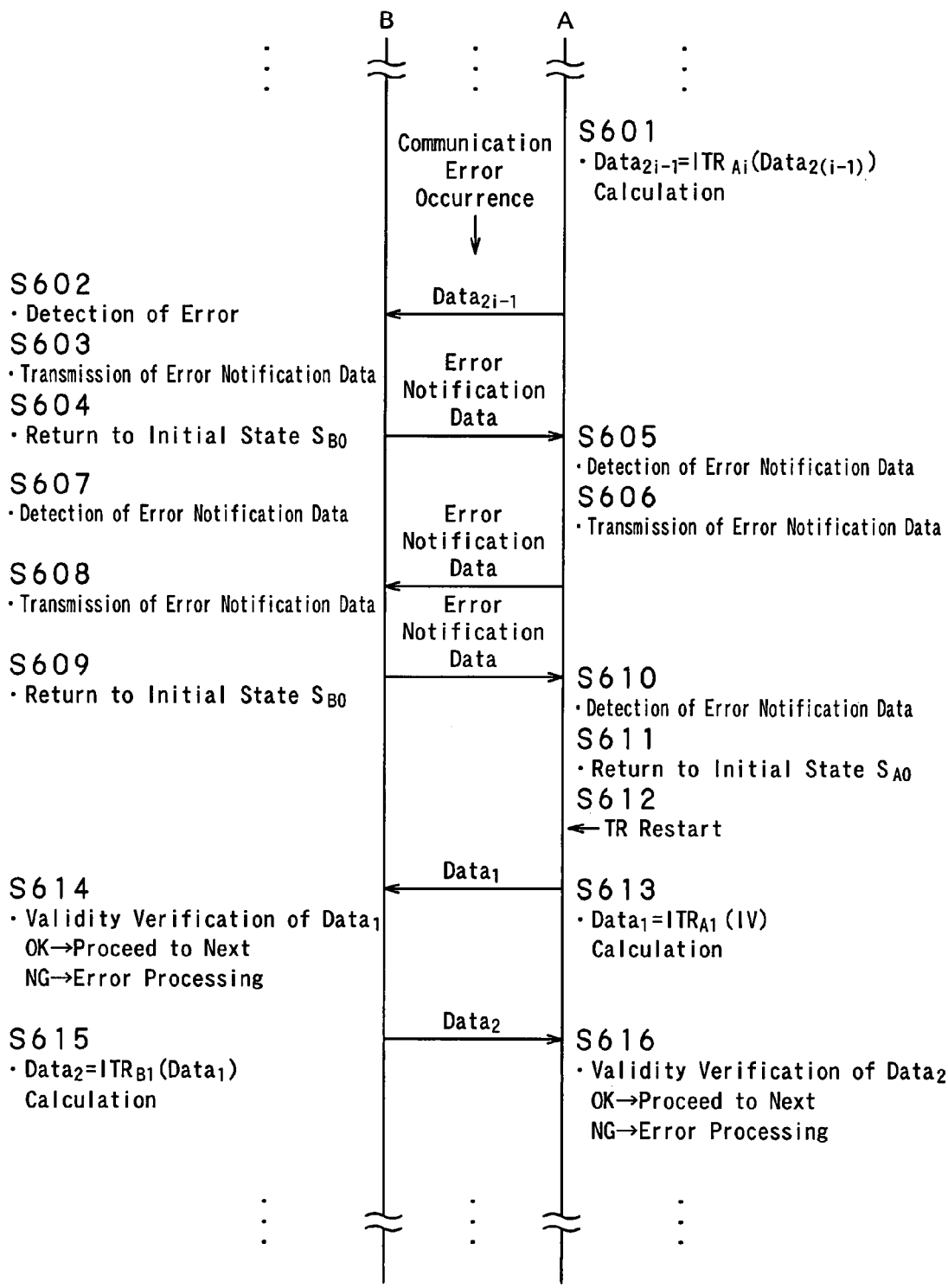
FIG. 8 is a sequence diagram showing the processing in the case where communication has taken place in transmit data of the entity A in data processing involving data communication between the entities A and B.

Also in the sequence of FIG. 8, the entity B executes the processing of B1 and B2 twice. However, since when the entity A finally returns to the initial state $S_{A0}$, the entity B also returns to the initial state $S_{B0}$, and data processing (TR) is restarted from the initial state at this time point, it becomes possible to perform error recovery in which internal states are securely synchronized with each other.

The processing procedure (4) to comply with error occurrence in communication data $Data_{2i}$ from the (4) entity B to the entity A will now be explained with reference to FIG. 9. Processing are executed in order of steps S701 to S715. In this example, S704 to S710 in the steps S701 to S715 indicate error detection processing and processing to comply with error, and processing of the step S711 indicate processing restart and processing after processing restart. The processing to comply with error of the steps S704 to S710 are executed at an arbitrary timing for execution time period of data processing involving communication between the entities A and B.

First, the entity A executes data processing (internal processing) $ITR_{Ai}$ of the entity A at step S701 to obtain data $Data_{2i-1}$ by the following expression.

$$Data_{2i-1} = ITR_{Ai}(Data_{2(i-1)})$$

The entity A transmits the data $Data_{2i-1}$ to the entity B.

At step S702, the entity B executes validity verification processing of data which has been received from the entity A. Namely, the entity B calculates parity bit or check sum to judge as to whether or not there is any error in data. In the case where it is judged that there is any error in data, processing shifts to error processing. The error processing in this case (3) is a processing at the time of error occurrence in communication data $Data_{2i-1}$ from the (3) entity A to the entity B, and is the processing which has been explained with reference to FIG. 8.

In this processing example, the entity B judges at step S702 that validity of data which has been received from the entity A has been confirmed, and the entity B executes data processing (internal processing) $ITR_{Bi}$ of the entity B at step S703 to execute a processing to calculate data $Data_{2i}$ by the following expression.

$$Data_{2i} = ITR_{Bi}(Data_{2i-1})$$

to transmit the generated data to the entity A.

In this processing example, it is assumed that error has taken place in communication of generated data of the entity B. At step S704, the entity A executes validity verification processing of data which has been received from the entity B. Namely, the entity B calculates parity bit or check sum to judge as to whether or not there is any error in data. In the case where it is judged that there is error in data, processing shifts to error processing.

In this processing example, at the step S704, the entity A detects error on the basis of receive data from the entity B. In this case, the entity A transmits error notification data to the entity B at step S705. This error notification data transmit processing corresponds to the error notification data transmit processing at the step S301 in the flowchart of FIG. 4 which has been already explained.

Then, the entity B receives error notification data from the entity A at step S706 to transmit the error notification data to the entity A at step S707 thereafter to return to the initial state $S_{B0}$ at step S708. The error notification data transmit processing at the step S707 corresponds to the error notification data transmit processing at the step S321 in the processing flow which has been already explained with reference to FIG. 5, and the initial state $S_{B0}$ return processing at the step S708 corresponds to the initial state $S_{B0}$ return processing at the step S322 in the processing flow of FIG. 5.

Then, the entity A receives error notification data from the entity B at step S709 to return to the initial state $S_{A0}$ at step S710. The error notification data receive processing at the step S709 corresponds to the error notification data receive processing at the step S302 in the processing flow which has been already explained with reference to FIG. 4, and the initial state $S_{A0}$ return processing at the step S710 corresponds to the initial sate $S_{A0}$ return processing at the step S303 in the processing flow of FIG. 4.

In this example, also in the case where it cannot be confirmed at step S709 by communication error that receive data from the entity B is error notification data, processing by the entity A proceeds to step S710 to return to the initial state $S_{A0}$. The detail of this processing will be explained in the [processing example with respect to communication error of error notification data] which will be described later.

The entity A returns to the initial state $S_{A0}$ at step S710 thereafter to restart data processing (TR) from the initial state at step S711. The steps S711 to S715 described below are similar to processing of the steps S409 to S412 of the sequence diagram of FIG. 6, and their explanation will be omitted.

As understood from the sequence which has been explained above, also in (4) error processing to comply with error occurrence in communication data $Data_{2i}$ from the entity B to the entity A, the entity A executes the processing in accordance with the flowcharts of FIGS. 4 and 5 which have been already explained, i.e., (A1) error notification transmit processing, (A2) error notification data receive processing after error notification data has been transmitted, or communication error data receive processing, and (A3) processing to return to the initial state $S_{A0}$ on the condition that these error notification data transmit/receive processing have been executed.

On the other hand, the entity B executes (B1) error notification transmit processing, and (B2) processing to return to the initial state $S_{A0}$ on the condition that error notification data transmit processing has been executed.

Figure 9:
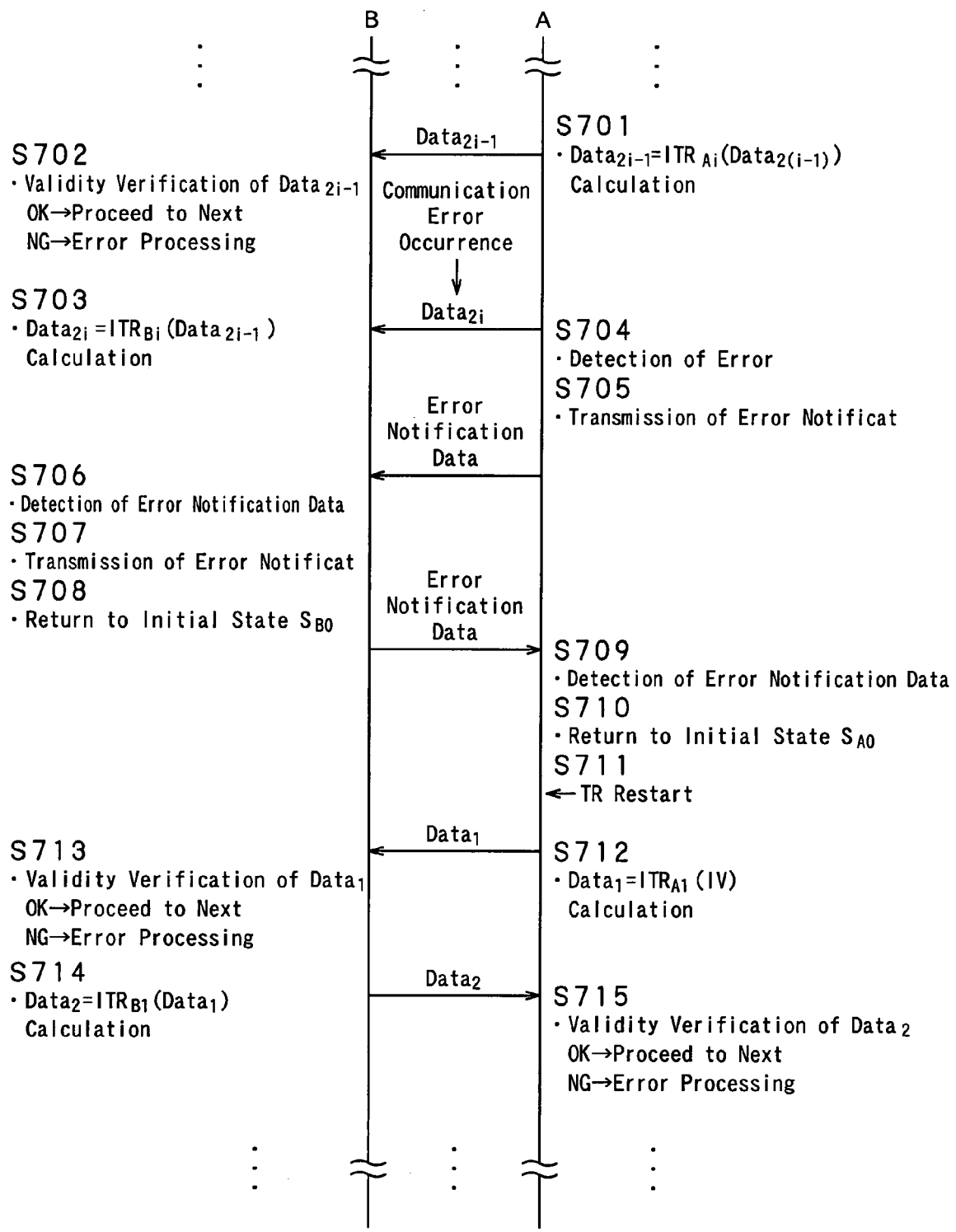
FIG. 9 is a sequence diagram showing the processing in the case where communication error has taken place in transmit data of the entity A in data processing involving data communication between the entities A and B.

Also in the sequence of FIG. 9, the entity B executes the processing of B1 and B2. When the entity A returns to the initial state $S_{A0}$, the entity B also returns to the initial state $S_{B0}$. At this time point, data processing (TR) is restarted from the initial state. Accordingly, it becomes possible to perform error recovery in which internal states are securely synchronized with each other.

[Processing Example with Respect to Communication Error of Error Notification Data]

In the processing sequence which has been explained with reference to FIGS. 6 to 9, occurrence of transmit error of error notification data subject to transmitting/receiving operations between the entities A and B is not taken into consideration. However, also in the case where transmit error takes place in error notification data, the entity A executes the processing in accordance with the flowchart shown in FIG. 4, and the entity B executes processing in accordance with the flowchart shown in FIG. 5. Thus, both entities return to the internal state in a manner synchronous with each other. As a result, it is possible to restart the data processing (TR) from the initial state.

The case where transmit error takes place in error notification data will now be explained. In the case where any error takes place in error notification data, there are error notification data of the steps S301 and S302 in the flowchart of FIG. 4, and error at the time of transferring error notification data at the step S321 in the flowchart of FIG. 5.

First, the processing at the time of error occurrence of error notification data of the steps S301 and S302 of FIG. 4 will be explained. In the flowchart shown in FIG. 4, the case where communication error takes place in error notification data is classified into three kinds of cases.

(1) The case where communication error takes place in data which has been transmitted at step S301.

(2) The case where communication error takes place in data which has been received at step S302.

(3) The case where the above-mentioned (1), (2) both take place.

First, the processing in the case where communication error takes place in data which has been transmitted at the step S301 will be explained. At step S301, data that the entity A transmits is error notification data. Accordingly, in the case where communication error takes place in this data, the entity B judges that there is no validity of receive data in the validity verification of receive data executed at step S225 in the processing flow of FIG. 3, e.g., validity verification processing based on parity check or check sum.

In accordance with this judgment, processing by the entity B shifts to error processing of the step S230 in the processing flow of FIG. 3. In the case where any communication error takes place, the entity B judges that corresponding data is error notification data to execute normal error processing.

Accordingly, also in both cases, the entity B starts the error processing shown in the flowchart of FIG. 5 to execute error notification processing of the step S321 of FIG. 5, and the entity A performs error notification receive processing of the step S302 of FIG. 4. Accordingly, normal error processing is executed. Thus, both entities return to the initial state in a manner synchronous with each other to have ability to restart data processing.

The case (2) where communication error has taken place in data which has been received at the step S302 will now be considered. At the time point when the step S302 is executed, the entity A already transmits error notification data to the entity B at step S301, and the entity A predicts that error notification data is necessarily returned from the entity B. This is because, in the error processing sequence of the present invention, there is prescribed the sequence in which the entity A transmits error notification data and error notification data is then returned from the entity B.

Accordingly, even in the case where it is not confirmed that receive data from the entity B is error notification, the entity A executes a processing to return to the initial state $S_{A0}$. At this time point, the entity B returns to the initial state $S_{B0}$ by the processing S321~S322 shown in FIG. 5. Thus, both entities return to the initial state in a manner synchronous with each other to have ability to restart data processing.

Finally, processing in the case where (3), (1) and (2) all take place, i.e., the case where error takes place in all transfers of error notification data of the steps S301 and S302 of FIG. 4 will be considered.

This processing is considered to be only combination of (1) the case where communication error takes place in data which has been transmitted at step S301, and (2) the case where communication error takes place in data which has been received at step S302. The entities A and B respectively execute processing in accordance with the processing shown in FIGS. 4 and 5 to return to the initial state to restart processing.

Namely, in the case where communication error first takes place in data which has been transmitted at step S301, the entity B detects error in the validity judgment processing of receive data at the step S225 so that the error processing is started to execute steps S321, S322 of the flowchart of FIG. 5 to return to the initial state $S_{B0}$.

Then, in the case where communication error takes place in transmit data at the step S302 of FIG. 4, since the entity A has already transmitted error notification data to the entity B at step S301, it predicts that error notification data is necessarily returned from the entity B. In the case where there is receive data from the entity B, the entity A executes initial state return processing at the step S303 shown in FIG. 4 irrespective of the fact that it is confirmed that corresponding data is error notification, or is not error notification to execute a processing to return to the initial state $S_{A0}$. As a result, both entities return to the initial state in a manner synchronous with each other thus to have ability to restart data processing.

The processing at the time of error occurrence in transfer of error notification data in the processing flow of the entity B side of FIG. 5 will now be explained. Namely, this processing corresponds to the case where error takes place in error notification data from the entity B to the entity A at the step S321 of the processing flow of FIG. 5.

This processing is a processing corresponding to transfer of error notification data at the step S302 of FIG. 4, and is entirely the same as the processing in connection with the case (2) where communication error takes place in data which has been received at the above-described step S302.

Namely, at the time point when the step S302 is executed, the entity A has already transmitted error notification data to the entity B at step S301, and the entity A predicts that error notification data is necessarily returned from the entity B. For this reason, in the case where there is receive data from the entity B, the entity A executes initial state return processing at the step S303 shown in FIG. 4 either when it is confirmed that corresponding data is error notification or when it is not, confirmed that corresponding data is error notification to execute a processing to return to the initial state $S_{A0}$.

On the other hand, the entity B executes the step S321 shown in FIG. 5 thereafter to execute a processing to return to the initial state $S_{B0}$ at step S322. As a result, both entities return to the initial state in a manner synchronous with each other thus to have ability to restart data processing.

[Configuration of Information Processing Apparatus]

A configuration example of the information processing apparatus adapted for executing data communication and data processing which have been described above will be explained with reference to FIG. 10. The entity which executes the above-described, processing may be composed of data communicatable information processing apparatus, e.g., PC (Personal Computer), mobile or portable terminal and/or device such as IC card, etc. Alternatively, in the case where one information processing unit constituted within PC and other information processing unit performs communication through bus, the above-described processing may be also performed. In this case, the respective information processing units perform roles of the above-described entities A and B.

Figure 10:
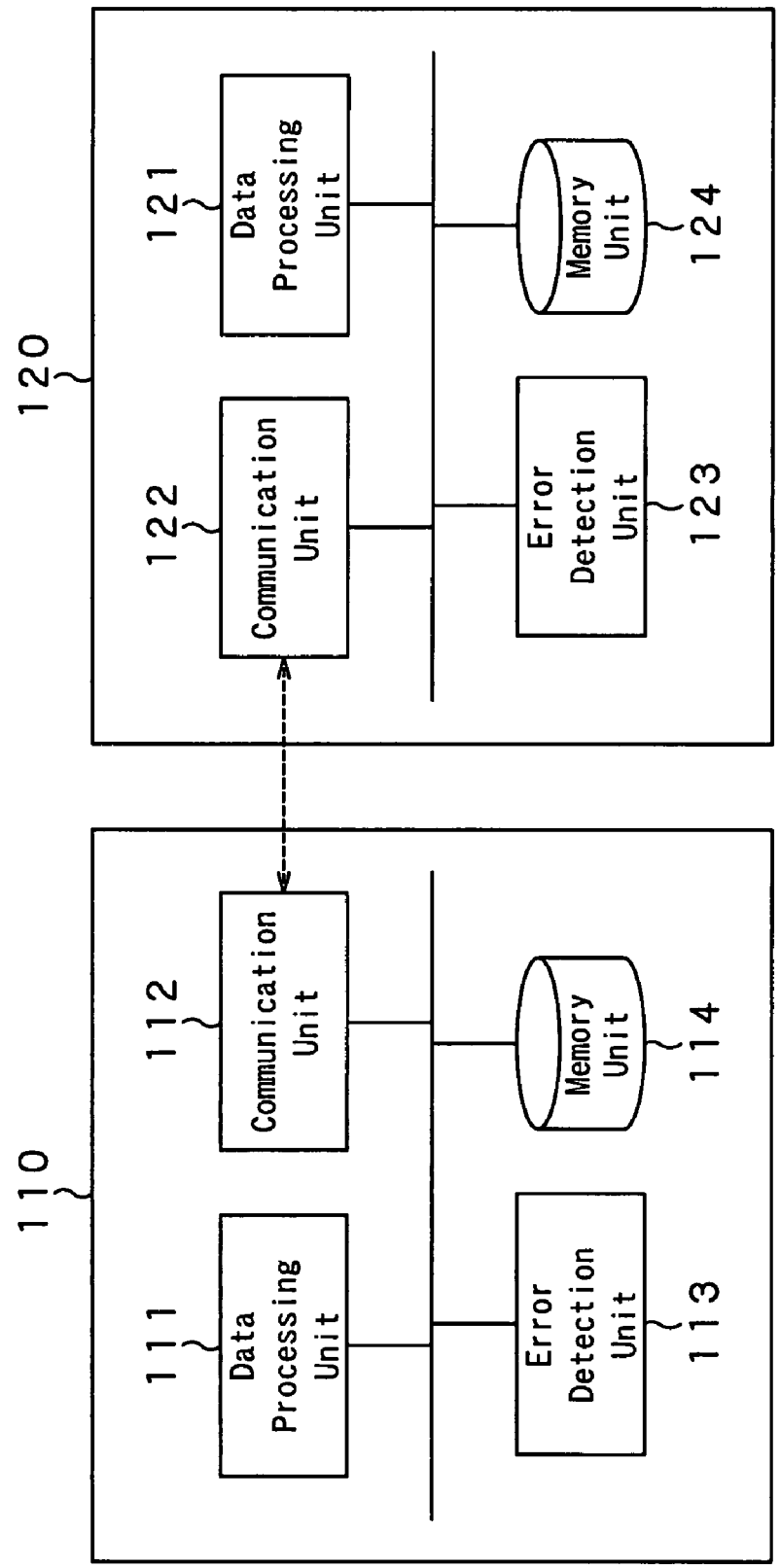
FIG. 10 is a block diagram showing an information processing apparatus adapted for executing data processing involving data communication between the entities A and B.

In FIG. 10, as one setting example constituting the entity, two information processing apparatuses 110, 120 are shown. The information processing apparatuses 110, 120 are composed of, e.g., PC. The information processing apparatus 110 includes a data processing unit 111, a communication unit 112, an error detecting unit 113, and a memory unit 114. The information processing apparatus 120 adapted for executing communication with the information processing apparatus 110 also includes a data processing unit 121, a communication unit 122, an error detecting unit 123, and a memory unit 124.

The information processing apparatuses 110 and 120 are caused to be of the similar configuration. The configuration of the information processing apparatus 110 will be explained as representative. The data processing unit 111 is comprised of CPU, etc. and serves to execute data processing in accordance with a predetermined program. Programs for data processing are stored in the memory unit 114. The CPU executes data processing in accordance with the processing sequence which is set in advance. Programs, which prescribe data processing sequences such as the data processing which have been already explained with reference to FIGS. 2 and 3, and the error processing and the initial state return processing, etc. which have been explained with reference to FIGS. 4 and 5, are stored in the memory unit 114. The CPU executes processing in accordance with this program.

The communication unit 112 executes communication with the information processing apparatus 120. In this example, as communication, there may be applied various communication means, e.g., Internet, Local network such as LAN, etc., cable and/or bus, etc. As previously described, the error detecting unit 113 executes error detection with respect to data calculation processing executed as internal processing in addition to validity verification of communication data based on parity check and/or check sum, etc. Also with respect to these error detections, processing therefor are executed in accordance with the program stored in the memory unit 114.

It is to be noted that while the data processing unit 111 and the error detection unit 113 are illustrated in a manner distinguished from each other, such distinctive illustration is employed for the purpose of explaining the function of the information apparatus, and there may be employed, as an actual processing configuration, a configuration in which a single CPU is applied to execute various data processing and/or error detection processing.

Either one of the information processing apparatus 110, 120 executes data processing as the above-described entity A, and the ther executes data processing as the entity B. The entity A executes data processing in accordance with the flowchart shown in FIG. 2, and executes error processing in accordance with the flowchart shown in FIG. 4. On the other hand, the entity B executes data processing in accordance with the flowchart shown in FIG. 3, and executes the error processing in accordance with the flowchart shown in FIG. 5.

By executing these processing, even in the case of occurrences of error in various modes, e.g., (1) error occurrence in data processing (internal processing) $ITR_{Ai}$ of the entity A, (2) error occurrence in data processing (internal processing) $ITR_{Bi}$ of the entity B, (3) error occurrence in communication data $Data_{2i-1}$ from the entity A to the entity B, and (4) error occurrence in communication data $Data_{2i}$ from the entity B to the entity A, both entities can return to the initial state in a manner synchronous with each other. Thus, it becomes possible to securely execute restart of data processing.

The present invention has been described in detail with reference to the specific embodiments. However, it is self-explanatory that those skilled in the art may perform modifications and/or substitutes within the scope which does not depart from the present invention. Namely, the present invention has been disclosed in the form illustrated, and it is therefore that the present invention should not be restrictively interpreted.

It should be noted that a series of processing which have been explained in the specification may be executed by hardware, software, and/or combination thereof. In the case of executing processing by software, programs in which processing sequences are recorded may be installed into memory in computer assembled in dedicated hardware to execute them, or programs may be installed into general purpose computer capable of executing various processing to execute them.

For example, program may be recorded in advance with respect to hard disc or ROM (Read Only Memory) as a recording medium. In addition, program may be temporarily or permanently recorded with respect to removable recording medium such as flexible disc, CD-ROM (Compact Disc Read Only Memory), MO (Magneto Optical) disc, DVD (Digital Versatile Disc), magnetic disc and/or semiconductor memory, etc. Such removable recording medium may be provided as the so-called package software.

It is to be noted that, in addition to installing program from removable recording medium as described above to computer, program may be wireless-transferred from download site, or may be transferred by wire through network such as Internet and the computer may receive program transmitted in such a way to install it into recording medium such as hard disc, etc. included therewithin.

It should be noted that various processing described in the specification are executed not only in a time series manner in accordance with the description, but also are executed in parallel or individually in dependency upon processing ability of an apparatus which executes processing, or as occasion demands. In addition, the system in this specification is logical assembly configuration of plural apparatuses, and is not limited to the system in which respective constituent apparatuses exist within the same casing.

The invention claimed is:

1. An information processing system composed of plural information processing units for mutually executing data communication, and for executing data processing in which communication data has been applied, the information processing system comprising:

a first information processing unit for transmitting an error notification data, on the basis of a detection of data processing error or a detection of data reception error, and executing an initial state return processing on a condition that data reception is made after the error notification data has been transmitted; and a second information processing unit for transmitting error notification data, on the basis of the detection of data processing error or the detection of data reception error, and executing the initial state return processing on the condition that a transmit processing of the error notification data has been executed, wherein the first information processing unit and the second information processing unit realize synchronization of an internal state, for both the first information processing unit and the second information processing unit, after executing the initial state return processing.

2. The information processing system according to claim 1, wherein the first and second information processing units are configured for mutually executing data transmit/receive processing, and the first and second information processing units are configured such that in a case where the data reception error is not detected, the first and second information processing units shift to an internal data processing, while in the case where the data reception error is detected, the first and second information processing units execute the transmit processing of the error notification data.

3. The information processing system according to claim 1, wherein the first information processing unit is configured such that both in the case where it is confirmed that data received from the second information processing unit is the error notification data after it has transmitted the error notification data to the second information processing unit, and in the case where it is confirmed that such data is a communication error data, the first information processing unit executes the initial state return processing.

4. The information processing system according to claim 1, wherein the second information processing unit is configured to detect error occurrence in the internal data processing that the second information processing unit itself executes, or occurrence of a communication of the data reception error from the first information processing unit to transmit the error notification data on the basis of the error detection to execute the initial state return processing on the condition that the error notification data has been transmitted.

5. An information processing apparatus adapted for executing data communication, and for executing data processing in which communication data has been applied, the information processing apparatus comprising:

an error detecting unit for detecting an internal processing error that the information processing apparatus itself executes, or occurrence of a communication error in data received from an apparatus communicating from an opposite side of the information processing apparatus;

a communication unit for transmitting error notification data on the basis of the internal processing error detection; and a data processing unit for executing initial state return processing on the condition that data reception is made after the error notification data has been transmitted, wherein the information processing apparatus realize synchronization of an internal state, for both the information processing apparatus and the apparatus communicating from an opposite side of the information processing apparatus unit, after executing the initial state return processing.

6. The information processing apparatus according to claim 5, wherein the information processing apparatus is configured such that both in the case where data received from an apparatus communicating from the opposite side of the information processing apparatus is error notification data, after error notification data with respect to the apparatus communicating from the opposite side of the information processing apparatus has been transmitted, and in the case where it is confirmed that such data is communication error data, it executes initial state return processing.

7. An information processing method of executing data communication, and of executing data processing in which communication data has been applied, the information processing method comprising:

an error detection step of detecting an internal processing error that a communication apparatus executes, or occurrence of a communication error in data received from an apparatus communicating from an opposite side of the communication apparatus; apparatus;

an error notification data transmit step of transmitting error notification data on the condition that internal processing error detection at the error detection step has been made; and an initial state return step of executing initial state return processing on the condition that data reception is made after the error notification has been transmitted, wherein the information processing method realize synchronization of an internal state, for both the communication apparatus and the apparatus communicating from an opposite side of the communication apparatus, after executing the initial state return processing.

8. The information processing method according to claim 7, wherein, at the initial state return step, both in the case where it is confirmed that data received from an apparatus communicating from the opposite side of the information processing apparatus is error notification data, after error notification data with respect to the apparatus communicating from of the opposite side of the information processing apparatus has been transmitted, and in the case where such data is communication error data, initial state return processing is executed.

9. A computer program product having computer readable storage medium with computer readable program code stored thereon, said computer readable code executable to perform operations comprising:

detecting an internal processing error that a communication apparatus executes, or occurrence of a communication error in data received from an apparatus communicating from an opposite side of the communication apparatus;

transmitting error notification data on the condition that internal processing error detection at the error detection step has been made; and executing initial state return processing on the condition that data reception is made after the error notification data has been transmitted, wherein the computer program product realize synchronization of an internal state, for both the communication apparatus and the apparatus communicating from an opposite side of the communication apparatus, after executing the initial state return processing.

* * * * *